(12) United States Patent
Gutknecht

(10) Patent No.: US 7,793,499 B2
(45) Date of Patent: Sep. 14, 2010

(54) BEARING SPACER AND HOUSING

(75) Inventor: Daniel A Gutknecht, Torrance, CA (US)

(73) Assignee: Honeywell International Inc., Morristown, NJ (US)

(*) Notice: Subject to any disclaimer, the term of this patent is extended or adjusted under 35 U.S.C. 154(b) by 269 days.

(21) Appl. No.: 11/552,826

(22) Filed: Oct. 25, 2006

(65) Prior Publication Data
US 2008/0098735 A1 May 1, 2008

(51) Int. Cl.
F02B 33/44 (2006.01)
(52) U.S. Cl. .............. 60/605.3; 60/605.1; 184/6.11
(58) Field of Classification Search .............. None
See application file for complete search history.

(56) References Cited

U.S. PATENT DOCUMENTS

| 3,581,504 | A | * | 6/1971 | Andrus | 60/259 |
| 4,358,253 | A | * | 11/1982 | Okano et al. | 417/407 |
| 4,364,717 | A | * | 12/1982 | Schippers et al. | 417/407 |
| 4,370,106 | A | * | 1/1983 | Lauterbach | 417/407 |
| 4,383,799 | A | * | 5/1983 | Okano et al. | 415/214.1 |
| 4,624,629 | A | * | 11/1986 | Murayama et al. | 417/407 |
| 4,655,043 | A | * | 4/1987 | McInerney | 60/602 |
| 4,789,253 | A | * | 12/1988 | Perego | 384/517 |
| 4,902,144 | A | * | 2/1990 | Thoren | 384/398 |
| 4,969,805 | A | * | 11/1990 | Romeo | 417/360 |
| 5,246,352 | A | * | 9/1993 | Kawakami | 417/407 |
| 5,295,300 | A | * | 3/1994 | Garrick, Jr. | 29/888.021 |
| 5,857,332 | A | * | 1/1999 | Johnston et al. | 60/607 |
| 6,264,424 | B1 | * | 7/2001 | Fuller | 415/9 |
| 6,874,998 | B2 | * | 4/2005 | Roby | 417/407 |
| 6,877,901 | B2 | * | 4/2005 | Wollenweber | 384/99 |
| 6,893,208 | B2 | * | 5/2005 | Frosini et al. | 415/112 |
| 6,905,316 | B2 | * | 6/2005 | Parker et al. | 417/407 |
| 7,108,488 | B2 | * | 9/2006 | Larue et al. | 417/407 |
| 7,189,005 | B2 | * | 3/2007 | Ward | 384/286 |
| 7,204,671 | B2 | * | 4/2007 | Dellmann | 415/111 |

* cited by examiner

Primary Examiner—Thomas Denion
Assistant Examiner—Douglas J. Duff
(74) Attorney, Agent, or Firm—Brian Pangrle

(57) ABSTRACT

An exemplary center housing rotating assembly includes a turbine wheel, a compressor wheel, a center housing with a through bore extending from a compressor end to a turbine end, a lubricant inlet and a lubricant outlet, a pair of bearings disposed at least partially in the through bore of the center housing, a bearing spacer and a shaft rotatably supported by the bearings and having a rotational axis coincident with a rotational axis of the turbine wheel and a rotational axis of the compressor wheel where the center housing includes bearing lubricant paths to direct lubricant from the lubricant inlet to the pair of bearings and a shaft lubricant path to direct lubricant from the lubricant inlet to the shaft in a manner dependent on rotational position of the bearing spacer in the through bore of the center housing. Various other exemplary devices, systems, methods, etc., are also disclosed.

20 Claims, 9 Drawing Sheets

BEARING SPACER AND HOUSING

TECHNICAL FIELD

Subject matter disclosed herein relates generally to turbomachinery for internal combustion engines and, in particular, to techniques for lubricating and cooling turbomachinery components.

BACKGROUND

A conventional turbocharger typically relies on a center housing rotating assembly (CHRA) that includes a turbine wheel and a compressor wheel attached to a shaft rotatably supported in a center housing by one or more bearings. During operation, and directly after operation, heat energy from various sources can cause components to reach temperatures in excess of 1000° F. Sources of heat energy include viscous heating of inlet gas and bearing lubricant, exhaust heat, frictional heating, etc., and factors such as mass of the rotating components can affect heat generation.

High temperatures can cause carbonization of carbonaceous lubricants, also known as coke formation or "coking". Coking can exasperate heat generation and heat retention by any of a variety of mechanisms and, over time, coke deposits can shorten the lifetime of a lubricated bearing system. For example, coke deposits can reduce bearing system clearances to a point where seizure occurs (e.g., between a bearing and a shaft), which results in total failure of the bearing system and turbocharger. Such phenomenon should be considered during development of turbochargers that operate at high rotational speeds or in high temperature environments and turbochargers with high mass rotating components. For example, use of high strength materials like titanium (e.g., titanium compressor wheels) for rotating components can increase mass of a rotating assembly and thus heat generation.

Various exemplary techniques described herein can reduce coking and, in general, local maximum operational temperatures of a turbocharger's rotating assembly.

BRIEF DESCRIPTION OF THE DRAWINGS

A more complete understanding of the various methods, devices, systems, arrangements, etc., described herein, and equivalents thereof, may be had by reference to the following detailed description when taken in conjunction with the accompanying drawings wherein.

DETAILED DESCRIPTION

Various exemplary methods, devices, systems, arrangements, etc., disclosed herein address issues related to technology associated with turbochargers.

Figure 1:
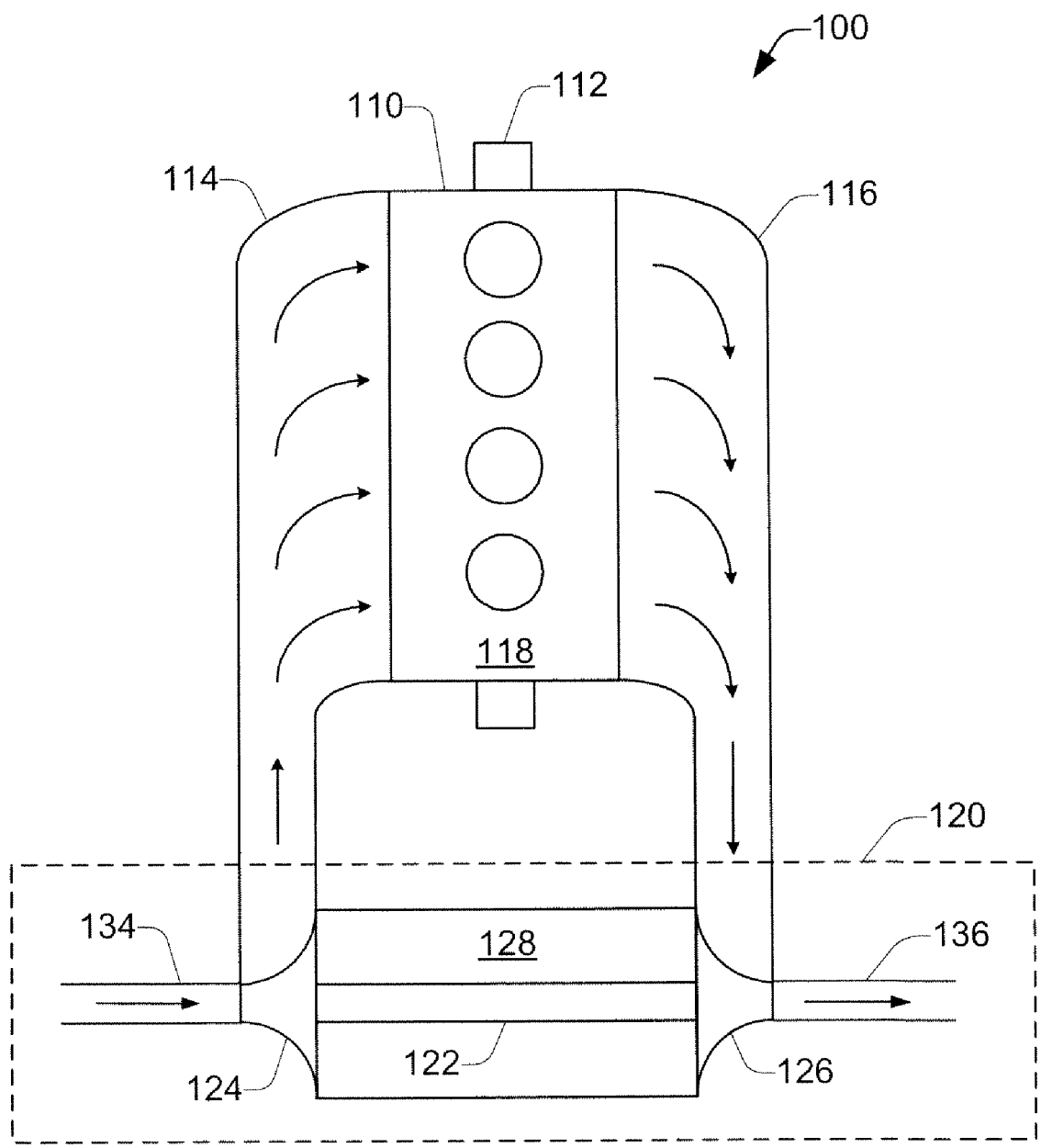
FIG. 1 is a diagram of a conventional turbocharger and internal combustion engine.

Turbochargers are frequently utilized to increase the output of an internal combustion engine. Referring to FIG. 1, a prior art system 100, including an internal combustion engine 110 and a turbocharger 120 is shown. The internal combustion engine 110 includes an engine block 118 housing one or more combustion chambers that operatively drive a shaft 112. As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which may be combined with fuel to form combustion gas. As shown in FIG. 1, the turbocharger 120 includes an air inlet 134, a shaft 122, a compressor 124, a turbine 126, a housing 128 and an exhaust outlet 136. The housing 128 may be referred to as a center housing as it is disposed between the compressor 124 and the turbine 126. The shaft 122 may be a shaft assembly that includes a variety of components.

Referring to the turbine 126, such a turbine optionally includes a variable geometry unit and a variable geometry controller. The variable geometry unit and variable geometry controller optionally include features such as those associated with commercially available variable geometry turbochargers (VGTs). Commercially available VGTs include, for example, the GARRETT® VNT™ and AVNT™ turbochargers, which use multiple adjustable vanes to control the flow of exhaust across a turbine. An exemplary turbocharger may employ wastegate technology as an alternative or in addition to variable geometry technology.

Figure 2:
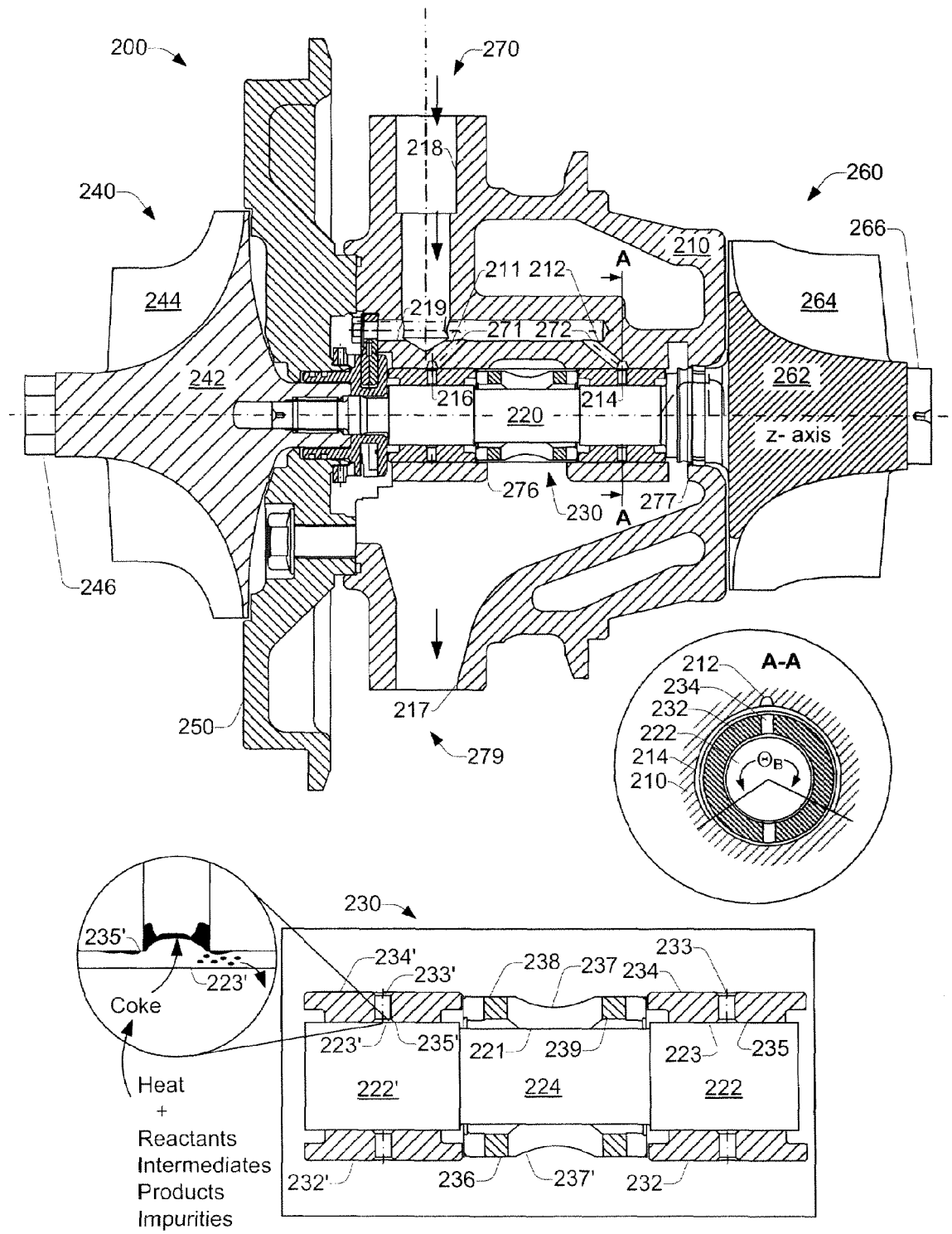
FIG. 2 is a series of cross-sectional views of a prior art center housing rotating assembly.

FIG. 2 shows several cross-sections of a prior art turbocharger assembly 200 suitable for use in the turbocharger 120 of FIG. 1. The cross-sections include a cross-section of a center housing rotating assembly, a cross-section through the assembly at plane A-A and a close-up cross-section of the bearing system 230.

The assembly 200 serves as a non-limiting example to describe various exemplary devices, methods, systems, etc., disclosed herein. The turbocharger 200 includes a center housing 210, a shaft 220, a compressor wheel 240 and a turbine wheel 260 where the compressor wheel 240 and the turbine wheel 260 are operably connected to the shaft 220. As already mentioned, the shaft 220 may be made of multiple components that form a single operable shaft unit. The compressor wheel 240, the turbine wheel 260 and the shaft 220 have an axis of rotation substantially coincident with the z-axis. The center housing 210 supports a bearing system 230 that receives the shaft 220 and allows for rotation of the shaft 220 about the z-axis.

The compressor wheel 240 includes a hub 242 and a plurality of blades 244. The hub 242 terminates at a nose end 246, which may be shaped to facilitate attachment of the wheel 240 to the shaft 220. The turbine wheel 260 includes a hub 262 and a plurality of blades 264. The hub 262 terminates at a nose end 266, which may be shaped to facilitate attachment of the wheel 260 to the shaft 220.

The shaft 220 includes a compressor shaft portion that extends into a bore of the compressor wheel hub 242. While the example of FIG. 2 shows a "boreless" compressor wheel (i.e., no through bore), other types of compressor wheels may be used. For example, a compressor wheel with a through bore or full bore typically receives a shaft that accepts a nut or other attachment mechanism at the nose end 246 of the hub 242. Such an attachment mechanism may include features to accept a socket or a wrench (e.g., consider a hexagonal shape).

In general, a bore is a cylindrical hole having a diameter and radius as well as a length along an axis. For example, a bore may be manufactured using a drill with an appropriate drill bit where the drill and drill bit may be selected based on the type of material to be drilled. For example, where the compressor wheel 260 is made of aluminum, a manufacturing process will specify a drill and drill bit as well as drill rotational speed and axial motion for drilling a bore in aluminum. As described herein, exemplary methods may include drilling prior to, during and/or after assembly of a center housing rotating assembly. Access to one or more surfaces for drilling may vary depending on the stage of assembly.

The center housing 210 includes a through bore for receipt of the bearing cartridge 230, a lubricant inlet bore 218 for forming a lubricant inlet 270, a transverse lubricant bore 219 for forming a lubricant distribution path to two bearing lubricant bores 211, 212 that form two bearing lubricant paths 271, 272, that provide lubricant to respective grooves 216, 214, which are less than circular as defined by an angle $\Theta_B$. The cross-section of the bearing system 230 at plane A-A shows the angle $\Theta_B$, which may be the same for the compressor side bearing 232' (see description below with respect to flow and coking).

The lubricant inlet bore 218, the transverse lubricant bore 219 are formed by drilling the center housing 210 from respective outer surfaces (e.g., a top surface and a frontal or compressor side surface). The transverse lubricant bore 219 also supplies lubricant to the compressor side thrust collar. The bearing lubricant bores 211, 212 are formed by drilling the center housing 210 prior to assembly by accessing the through bore of the center housing 210 via a turbine end to form the bore 212 and by accessing the through bore of the center housing 210 via a compressor end to form the bore 211. Hence, the bores 211, 212 form angles to the rotational axis (z-axis) that may be, in part, dictated by one or more through bore diameters and/or one or more through bore lengths along the axis.

The housing 210 further includes intermediate lubricant outlets 276 and 277 and an opening 218 for forming a lubricant outlet 279. In general, lubricant flows through the center housing 210 under pressure, partially facilitated by gravity (e.g., lubricant inlet 270 and lubricant outlet 279 substantially aligned with acceleration of gravity). Thus, upon shut down, gravity may cause draining of lubricant from the center housing 210.

In the arrangement of FIG. 2, a lubricant film exists between portions of the through bore of the center housing 210 and portions of the bearing cartridge 230, which allow the bearing system 230 to "float" in the through bore. The close-up cross-section of the bearing system 230 shows a three component bearing system that includes a turbine side bearing 232, a compressor side bearing 232' and a bearing spacer 236. The shaft 220 has a turbine side portion 222 that cooperates with the turbine side bearing 232 (via bearing inner surface 235 and shaft surface 235), a compressor side portion 222' that cooperates with the compressor side bearing 232' (via bearing inner surface 235' and shaft surface 235') and a portion 224 (having surface 221) disposed between the turbine side portion 222 and the compressor side portion 222'. The compressor side of the assembly is used to describe functioning in more detail, noting that the turbine side includes the same features to perform similar functions.

The compressor portion 222' of the shaft 220 includes the journal surface 223' set at a journal surface radius and the compressor side bearing 232' includes the corresponding inner surface 235' set at a compressor bearing inner surface radius. On the compressor side, lubricant enters the bearing 232' at an opening 233', which is fed by the bearing lubricant path 271 defined in part by the bearing lubricant bore 211. During operation, heat energy causes heating of the lubricant, which in turn may cause coke formation (e.g., from reactants, intermediates, products, impurities, etc.). Coke may deposit on any of a variety of surfaces. For example, coke may deposit on the shaft 220 and/or the bearing 232' and diminish clearance between the journal surface 223' of the shaft portion 232' and bearing inner surface 235'. Alternatively, or in addition to, coke may deposit in the opening 233' and hinder flow of lubricant to the shaft 220. In such examples, coke may cause a reduction in heat transfer and an increase heat generation, which may lead to failure of the bearing system.

In the arrangement of FIG. 2, the bearing spacer 236 includes an outer surface 238 disposed at an outer surface radius ($R_O$), an inner surface 239 disposed at an inner surface radius ($R_I$) and a pair of openings 237, 237'. The entire bearing system 230 may rotate in the through bore of the center housing 210 and the individual bearing system components 232, 232' and 236 may rotate with respect to each other. These components typically rotate at some fraction of the rotational speed of the shaft (e.g., spacer rpm ~⅛ of shaft rpm, bearing rpm ~¼ of shaft rpm). Hence, the relationship between the bearing lubricant bores 211 and 212 of the center housing 210 and the openings 233, 233', 237 and 237' may change during operation of the center housing rotating assembly. However, the arrangement of the grooves 214 and 216 of the through bore ensures that at least one bearing opening can receive lubricant, regardless of the rotational relationship between the center housing 210 and the bearing 232 or 232'. Further, while the bearings 232 and 232' are each shown as having two, opposing openings, a bearing may have any number of openings.

Figure 3:
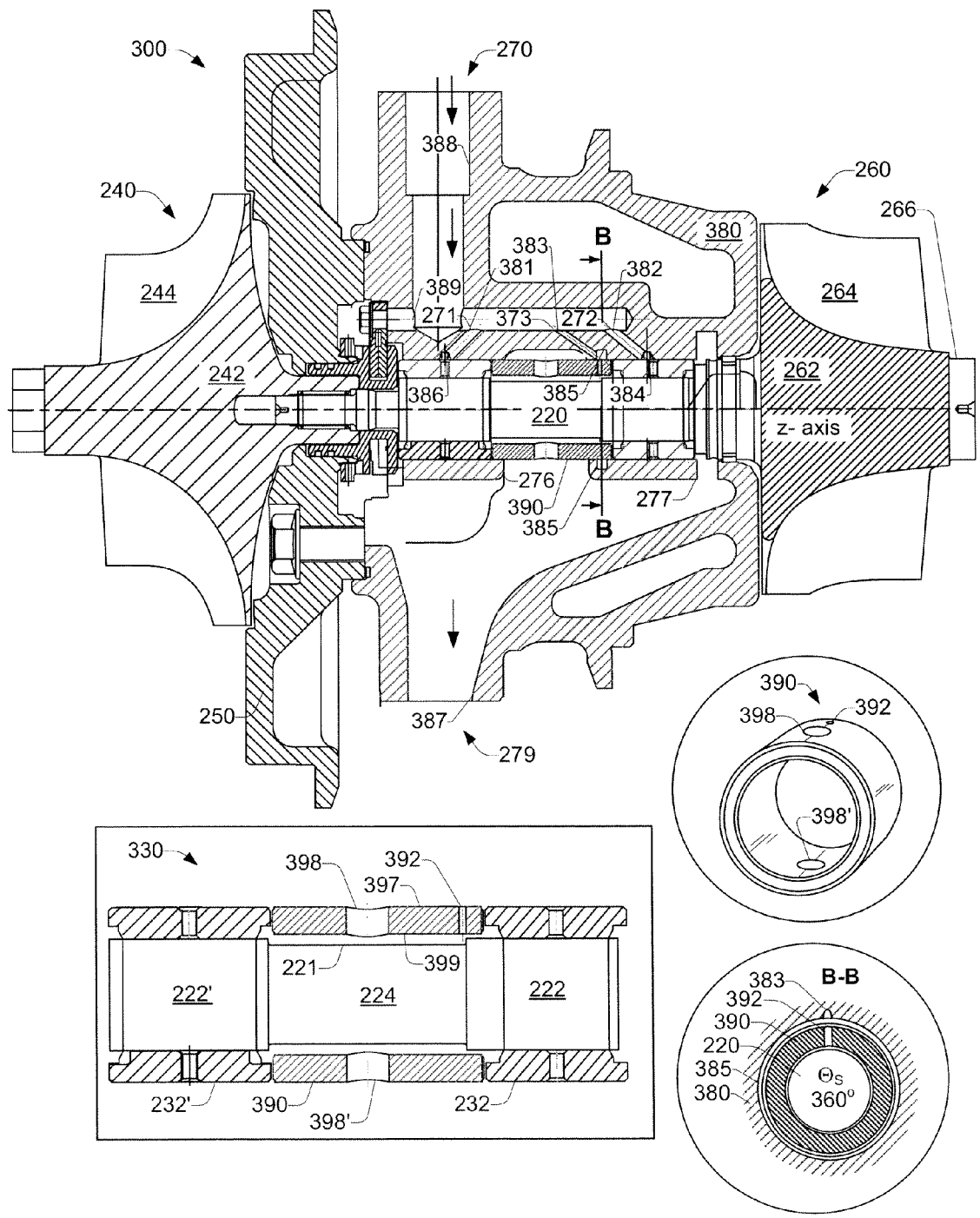
FIG. 3 is a series of cross-sectional views of an exemplary center housing rotating assembly and a perspective view of an exemplary bearing spacer.

As mentioned in the Background section, coke formation can cause failure or shorten the life of a bearing system. FIG. 3 shows an exemplary center housing rotating assembly 300 that includes a center housing 380 configured to provide lubricant to a portion of a shaft 220 other than at a journal surface. More specifically, the center housing 380 cooperates with a bearing spacer 390 that directs lubricant to at least a shaft surface 221 that is positioned between a turbine side portion 222 and a compressor side portion 222 of the shaft 220.

In the example of FIG. 3, such cooperation occurs via a lubricant path 373, which is defined in part by a shaft lubricant bore 383, and a corresponding shaft lubricant opening 392 in the cylindrical wall of the bearing spacer 390. The lubricant path 373 receives lubricant from the lubricant inlet 270 as it flows via the inlet lubricant bore 388 and the transverse lubricant bore 389, the latter of which connects to the shaft lubricant bore 383. The shaft lubricant bore 383 of the center housing 380 has an opening to a groove 385 or directly to the through bore of the center housing 380.

FIG. 3 shows a perspective view of the exemplary bearing spacer 390, a cross-sectional view of the bearing system and a cross-sectional view through the bearing spacer at plane B-B. Each of these views shows the shaft lubricant opening 392 of the bearing spacer while a cross-sectional view of the exemplary center housing rotating assembly 300 and the cross-sectional view at plane B-B show the exemplary shaft lubricant path 373 in cooperation with the shaft lubricant opening 392 of the bearing spacer 390. While the opening 392 is referred to as a shaft lubricant opening, the purpose of the opening is primarily to provide lubricant to a surface(s) of the shaft to cool the shaft. For example, the opening 392 provides for a lubricant jet directed to the shaft 220.

As already mentioned, various components of a bearing system may rotate with respect to each other and/or with respect to a through bore of a center housing. In the example of FIG. 3, a groove 385 in the through bore of the center housing 380 spans an angle $\Theta_S$, which may be a full circle (i.e., 360°) or less. The angle may be chosen based at least in part on the number of openings or the nature of an opening(s) in a bearing spacer and/or the relationship between the bearing spacer and the center housing through bore. For example, where a bearing spacer has a single opening and can rotate a full 360° then a center housing may include a full circle groove substantially aligned with the axial position of the opening along the z-axis (e.g., the rotational axis of the bearing spacer) to ensure that a path exists from a shaft lubricant path to the opening. While an angle shown in FIG. 3 is 360°, again, the angle may be less than 360° for the single opening bearing spacer 390 or other exemplary bearing spacer. In other instances, a groove may be less than a full circle and the lubricant jet may be periodic (e.g., pulsatile) depending on the rotational speed of the spacer 390. For arrangements that result in pulsatile flow, such flow can help prevent build up around an opening or path as pressure varies with rotation of a spacer with respect to a through bore of a housing.

In general, the overall arrangement of features related to a lubricant jet or jets emerging from a spacer to the shaft aims to balance various phenomena. If a lubricant jet supplies too much lubricant to the shaft (e.g., too high of a feed rate), the lubricant may build up in the annular space between the shaft and the spacer and generate heat. Conversely, a jet that supplies too little lubricant to the shaft may not provide adequate cooling of the shaft. The former build up issue may be remedied to some extent by features to increase lubricant drainage, however, any shaft lubricant jet is inherently parasitic in that it can divert flow from the thrust collar and the bearings. Some aspects of lubricant supply pressure in relationship to lubricant cooling features are discussed with respect to FIG. 12 below.

The close-up cross-sectional view of the bearing system 330 shows the bearing spacer 390 in cooperation with a turbine side bearing 232 and a compressor side bearing 232'. In this example, the bearings 232 and 232' are asymmetric. In particular, the bearing 232' has an axial length that exceeds the axial length of the bearing 232. Such asymmetry may allow for formation of the groove 385, especially when the angle $\Theta_S$ is large (e.g., approximately 360°). For example, if the length of the bearing 232 were greater then the center housing 380 may not adequately accommodate the full circle groove 385. In alternative example, a center housing includes features that allow for a symmetric set of bearings or a symmetric arrangement of bearings and an appropriate groove for providing lubricant to a bearing spacer that includes one or more openings for directing lubricant to a shaft.

In the example of FIG. 3, the bearing spacer 390 includes an opposing pair of openings 398, 398' that allow for passage of lubricant from or to a space defined by the center housing 380 (e.g., a central space that extends outwardly from the through bore) and to an opening 276 for drainage of lubricant from the bearing region.

The exemplary center housing 380 and bearing spacer 390 of FIG. 3 may be suitable for use with a titanium compressor wheel. For example, the compressor wheel 240 may be manufactured from titanium (density ~4.5 g/cm$^3$), which is more dense than aluminum (density ~2.7 g/cm$^3$). The increased density adds mass where the volume of a titanium wheel is more than about 60% that of an aluminum wheel. In turn, the increased mass can lead to decreased stability and increased heat generation during operation. In particular, a substantial part of the burden may be placed at the compressor end of the center housing rotating assembly. Hence, in the example of FIG. 3, to accommodate the opening 392 in the bearing spacer 390, the axial length of the turbine side bearing 232 is compromised instead of the axial length of the compressor side bearing 232', as the compressor side bearing 232' may experience additional force due to the increased weight of a titanium compressor wheel. In addition, an exhaust turbine can conduct heat along a shaft to the center housing. Thus, cooling of the shaft 220 can be more effective on the turbine side as the temperature differential between the lubricant and the shaft may be greater than on the compressor side.

As already explained with respect to FIG. 2, during manufacture bores are typically drilled into the center housing. The shaft lubricant bore 383, as explained further below, may be drilled via the turbine end of the through bore of the center housing 380. The angle at which the axis of the shaft lubricant bore 383 meets the z-axis may be less than that of the turbine side bearing lubricant bore 272 as the shaft lubricant bore 373 is deeper in the through bore of the center housing.

Figure 4:
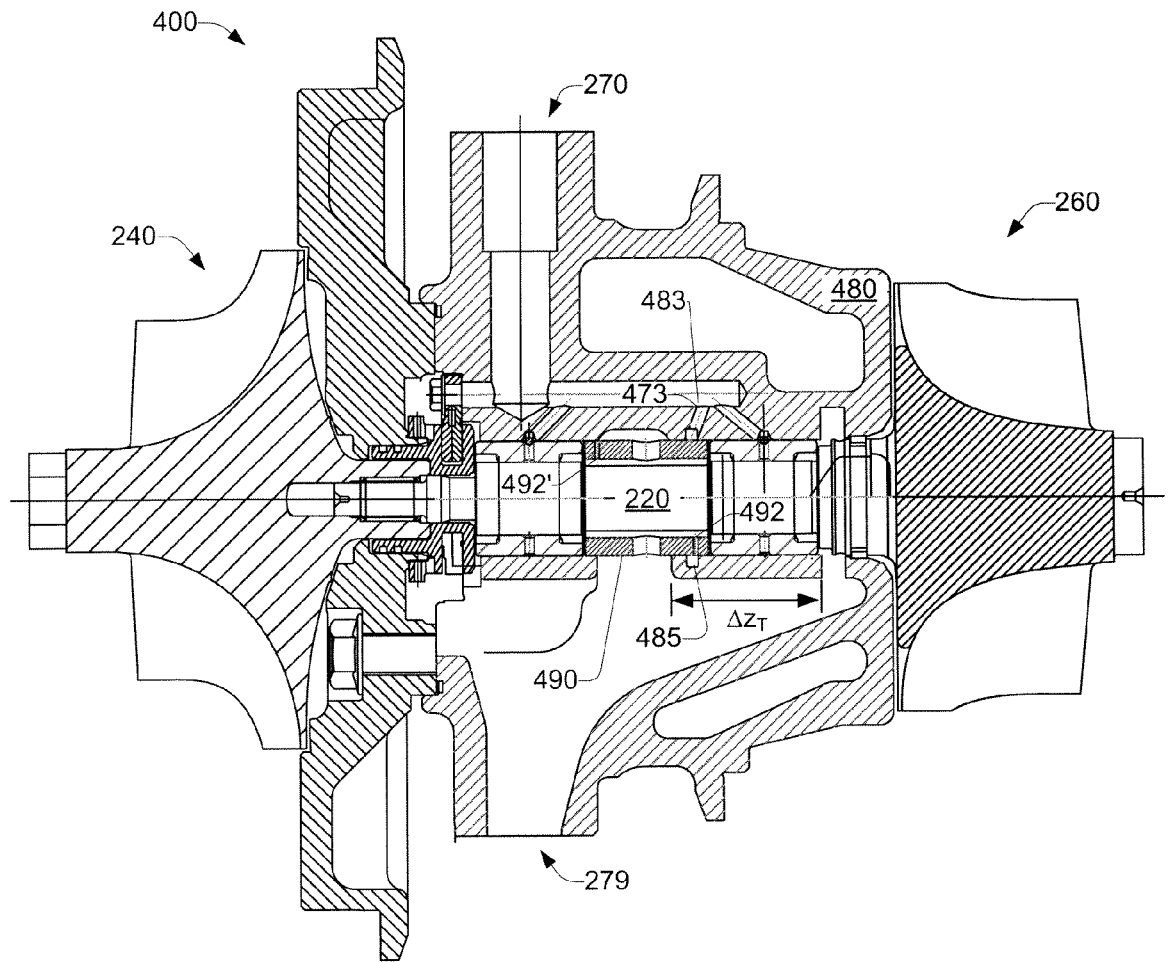
FIG. 4 is a cross-sectional view of an exemplary center housing rotating assembly that includes an exemplary bearing spacer.

FIG. 4 shows a cross-sectional view of an exemplary center housing rotating assembly 400 that includes various features of the assembly 300 of FIG. 3. In the example of FIG. 4, an exemplary bearing spacer 490 includes at least one compressor side opening 492' to the shaft 220 and at least one turbine side opening 492 to the shaft 220. In addition, the assembly 400 includes an extended through bore segment designated by the distance $\Delta z_T$, as this extended segment is on the turbine side of the through bore. This extended segment allows for adequate space for a groove 485 that connects with the shaft lubricant bore 483, which, in turn, cooperates with the lubricant opening 492 of the bearing spacer 490. The extended segment further allows for symmetrical selection and arrangement of turbine side and compressor side bearings; noting that an asymmetry exists in a space extending radially outward from the through bore where the space is adjacent the bearing spacer portion of the through bore.

In the example of FIG. 4, on the compressor side of the bearing spacer 490, the space that extends outwardly from the through bore provides a flow path for lubricant to the compressor side shaft lubricant opening 492' of the bearing spacer 490. Hence, the assembly 400 provides two paths for cooling of the shaft 220.

Figure 5:
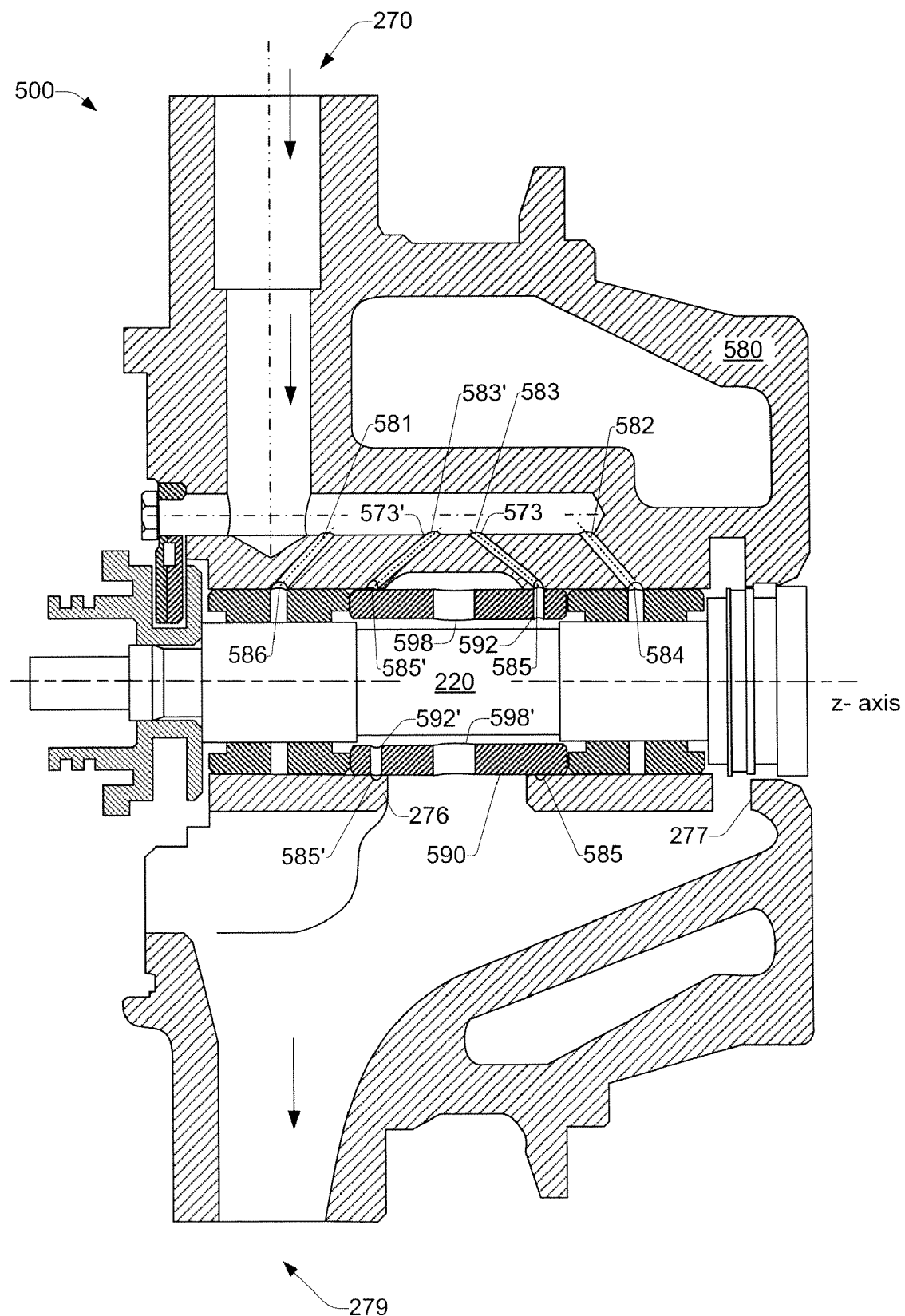
FIG. 5 is a cross-sectional view of an exemplary center housing rotating assembly with multiple shaft lubricant paths.

FIG. 5 shows a cross-sectional view of an exemplary center housing assembly 400 with a center housing 480 that includes a plurality of shaft lubricant paths 473, 473' for cooling a shaft 220. In the example of FIG. 5, a turbine side shaft lubricant bore 583 defines at least in part the turbine side shaft lubricant path 573 while a compressor side shaft lubricant bore 583' defines at least in part the compressor side shaft lubricant path 573'. The exemplary center housing 580 includes a pair of grooves 585, 585' where the turbine side groove 585 cooperates with the lubricant path 573 and the turbine side opening 592 of the bearing spacer 590 while the compressor side groove 585 cooperates with the lubricant path 573' and the compressor side opening 592' of the bearing spacer 590. The grooves 585, 585' may be full circle or less. Each of the bores 583, 583' includes an opening that opens directly or indirectly to the through bore of the center housing. The relationship of a bore opening (e.g., for bores 583, 583') to a bearing spacer opening 592, 592' may control flow of lubricant to the shaft 220. Further, the relationship of a groove 585, 585' in the through bore to a bearing spacer opening 592, 592' may control flow of lubricant to the shaft 220.

Figure 6:
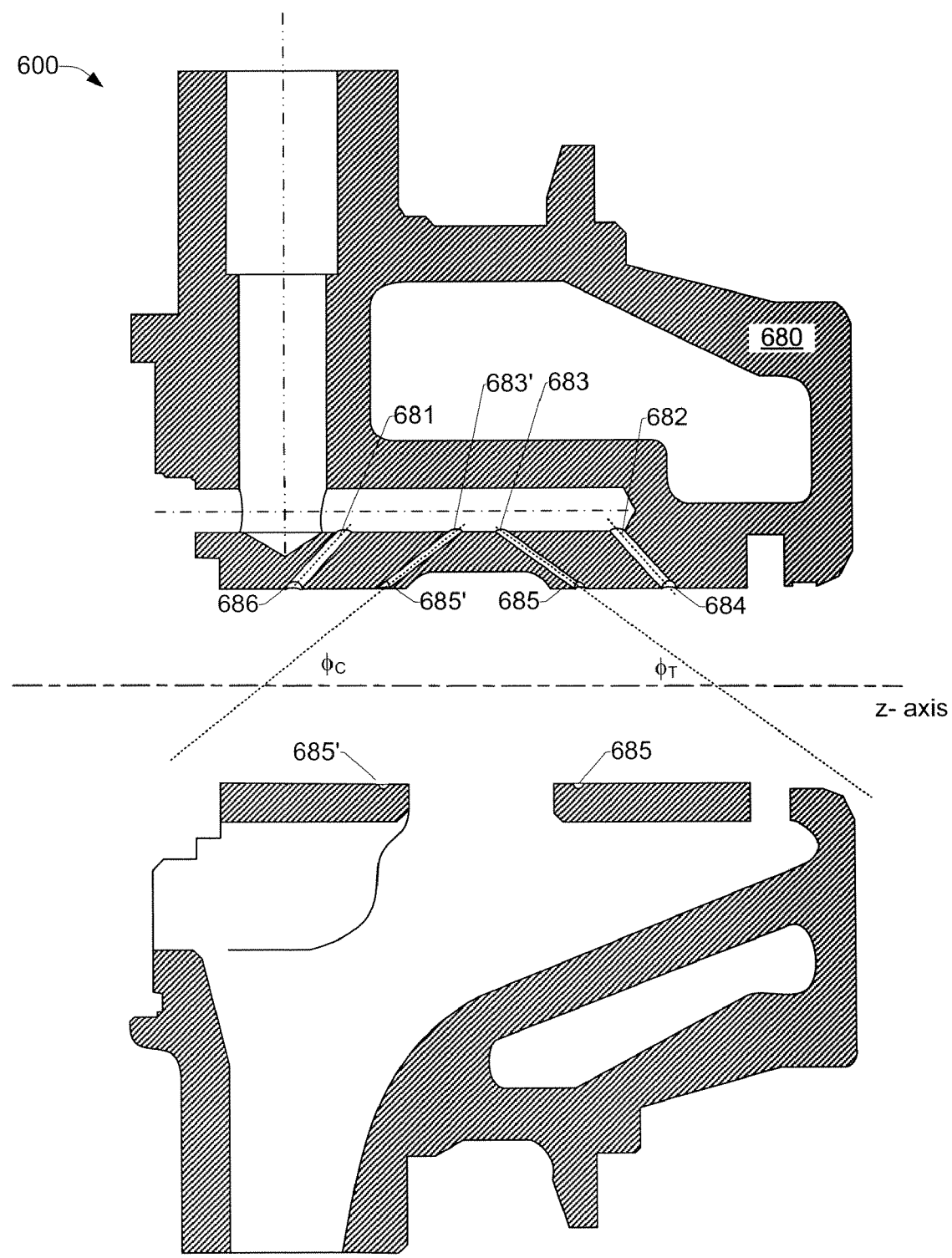
FIG. 6 is a cross-sectional view of the exemplary center housing of FIG. 5.

FIG. 6 shows a cross-sectional view of an exemplary center housing 680 and various angles associated with shaft lubricant bores 683, 683'. Each shaft lubricant bore has a length along a respective axis and each axis is shown as intersecting the z-axis of the through bore of the center housing 680 at a respective angle $\phi_C$ and $\phi_T$. In other examples, a lubricant bore axis may not intersect the z-axis (i.e., rotational axis), however, such angles may be determined or approximated via a two-dimensional planar projection through the center housing, which would show intersection of an axis or flow direction of a lubricant path and the z-axis. A shaft lubricant bore may have a substantially cylindrical shape.

The angles $\phi_C$ and $\phi_T$ of FIG. 6 show that the bore 683 may be drilled into the center housing 680 via a turbine end of the through bore and that the bore 683' may be drilled into the center housing 680 via a compressor end of the through bore. Such angles may be taken into account during manufacture of an assembly and more specifically upon selection of a bearing spacer, if used. Other techniques may exist for forming the bores 683, 683' (e.g., laser drilling, water jet drilling, etc.).

Where symmetry exists for a bearing spacer and various other components (e.g., compressor side and turbine side bearings), then assembly may occur by inserting components into the through bore of a center housing from a turbine side or from a compressor side. For example, an asymmetric bearing spacer that is asymmetric due to inclusion of one or more so-called "turbine side" openings or one or more so-called "compressor side" openings will require care during assembly to ensure that the one or more openings are positioned properly with respect to the turbine side or the compressor side. Hence, to reduce risk of such errors, as described further below, an exemplary bearing spacer may include symmetric features for providing lubricant to a shaft of an assembly where some of the symmetric features are not "used" during operation of the assembly.

Figure 7:
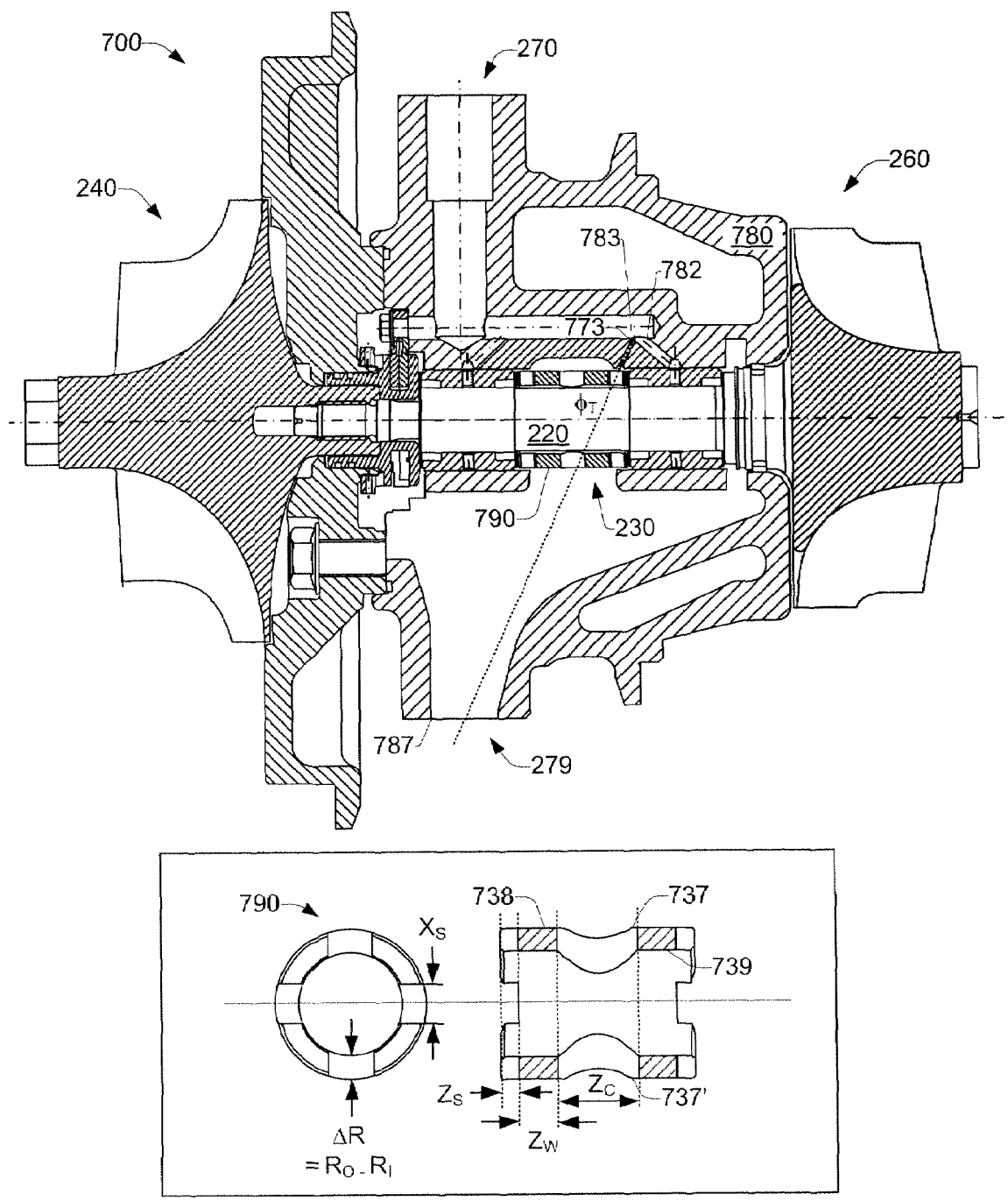
FIG. 7 is a cross-sectional view of an exemplary center housing rotating assembly that includes an exemplary bearing spacer.

FIG. 7 shows a cross-sectional view of a center housing rotating assembly 700 that includes a shaft lubricant path 773 to cool the shaft 220. A close-up cross-sectional view and end view of the exemplary spacer 790 are also shown in FIG. 7. The example of FIG. 7 differs from the example of FIG. 3 in several aspects. For example, a shaft lubricant bore 783 that defines at least in part the shaft lubricant path 773 is set an angle ($\phi_T$) to the z-axis that differs substantially from that of the adjacent turbine bearing lubricant bore 782. During manufacture, such an exemplary center housing may rely on drilling a bearing lubricant bore via an end of a through bore of the center housing and may rely on drilling a shaft lubricant bore via an opening of the housing that serves as a lubricant outlet or drain. In FIG. 7, the shaft lubricant bore 783 may be drilled via the opening 787, which serves as a lubricant outlet 279.

The example of FIG. 7 also includes a symmetric bearing system where the axial length of the compressor side bearing and the axial length of the turbine side bearings are approximately equal. Further, the bearing spacer 236 may be a conventional bearing spacer such as that of the bearing system 230 of FIG. 2, however, the close-up views of the bearing spacer 790 illustrate some differences. The bearing spacer 790 and the bearing spacer 236 may be defined in part by the following dimensions: overall axial length from a compressor side end to a turbine side end, axial width of cross-drilled opening ($Z_C$), axial length of outer wall ($Z_W$), axial depth of slot ($Z_S$), width of slot ($X_S$) and radial thickness ($\Delta R$) of spacer. The bearing spacer 790 includes an axial slot depth ($Z_S$) that exceeds that of the conventional spacer 236 to allow a lubricant jet emerging from the center housing 780 opening 783 to impinge directly upon the shaft 220. In this manner, the lubricant jet is defined by the opening 783 of the center housing 780 and not by a feature of the spacer 790. Yet, the spacer 790 controls timing of the lubricant jet via its four turbine side slots. While four slots are shown on each side of the bearing spacer 790, the number of slots may be a variable to achieve adequate cooling. For example, slot width, number of slots, rotational speed, etc., may be selected to achieve adequate cooling. An exemplary bearing spacer may be symmetrical in a manner where the turbine side end and the compressor side end are essentially the same and thus allow for ease of assembly (e.g., where the direction of insertion of the spacer into the through bore not important).

In the example of FIG. 7, the bearing spacer 790 also has a narrower cross-drilled opening 737 when compared to the conventional bearing spacer 236. The narrower opening 737 can allow for deeper slots and adequate axial wall length ($Z_W$). Further, one or more dimensions of the opening 737 may be selected to provide adequate lubricant drainage.

In general, the bearing spacer 790 has a cylindrical wall having an axial length defined by a turbine side end and a compressor side end, slots that extend axially inward from the turbine side end and slots that extend axially inward from the compressor side end. As discussed with respect to FIG. 11, the openings 737, 737' may be optional or of any particular shape.

In various examples, the shaft lubricant path may have dimensions that provide for an adequate amount of lubricant flow without compromising flow to one or more bearing lubricant paths. For example, in FIG. 7, the shaft lubricant bore has a cross-sectional flow dimension that is less than a cross-sectional flow dimension of the adjacent turbine bearing lubricant bore 782. In turbocharger bearing systems, a primary goal is to lubricate bearing surfaces, hence, proper selection of an exemplary shaft lubricant bore can increase cooling without any significant reduction in bearing lubrication. For example, the opening 783 may have a diameter of about 1 mm while the adjacent turbine bearing lubricant opening 782 may have a diameter of about 3 mm.

Figure 8:
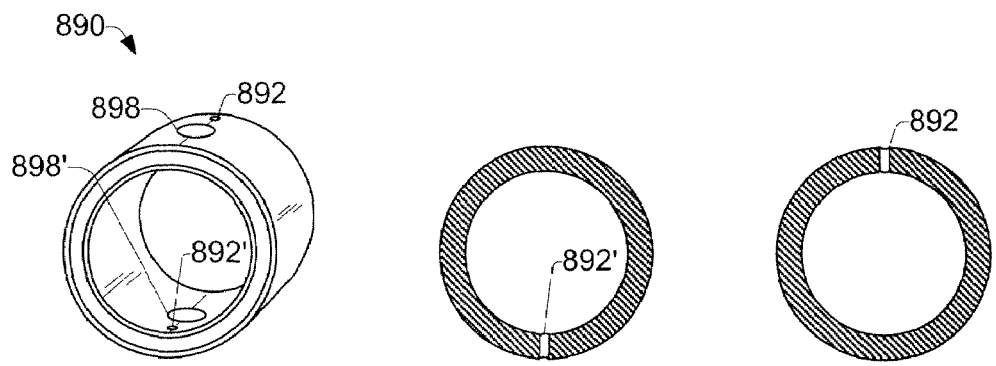
FIG. 8 is a perspective view and two cross-sectional views of an exemplary bearing spacer.

FIG. 8 shows a perspective view and cross-sectional views of an exemplary bearing spacer 890 that includes "symmetric" features. In particular, a rotational symmetry exists for the openings 892 and 892'. Hence, upon assembly of a bearing system, the direction of the bearing spacer 890 would not be a factor. For example, if the bearing system was destined for a center housing having an asymmetric arrangement of shaft lubricant path(s), the direction of the bearing spacer would not be a factor as either opening could serve to cooperate with the arrangement of shaft lubricant path(s) and to direct lubricant to a shaft. Noting that if the bearing spacer 890 were prevented from rotation in a through bore of a center housing, factors such as a groove angle(s), etc., may need to be accounted for during assembly. In the example of FIG. 8, the openings 898, 898' may be provided for lubricant flow or may be omitted.

Figure 9:
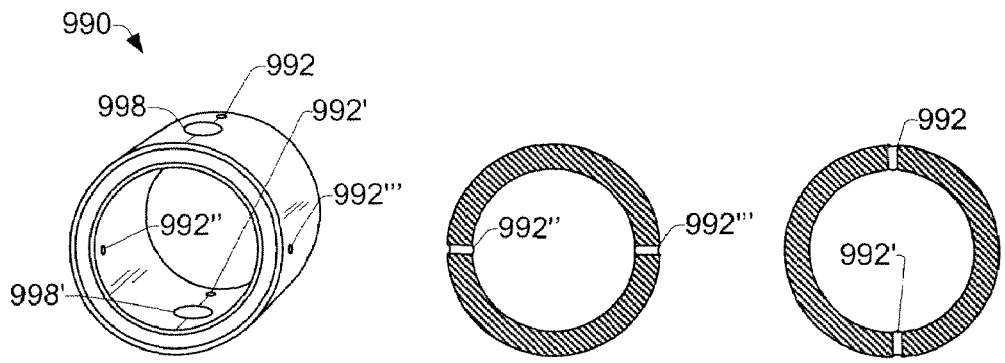
FIG. 9 is a perspective view and two cross-sectional views of another exemplary bearing spacer.

FIG. 9 shows a perspective view and cross-sectional views of an exemplary bearing spacer 990. In this example, the bearing spacer 990 includes rotational symmetry for openings 992, 992' and openings 992", 992'". Noting that if the bearing spacer 990 were prevented from rotation in a through bore of a center housing, factors such as a groove angle(s), etc., may need to be accounted for during assembly. In the example of FIG. 9, the openings 998, 998' may be provided for lubricant flow or may be omitted.

Figures 10, 11:
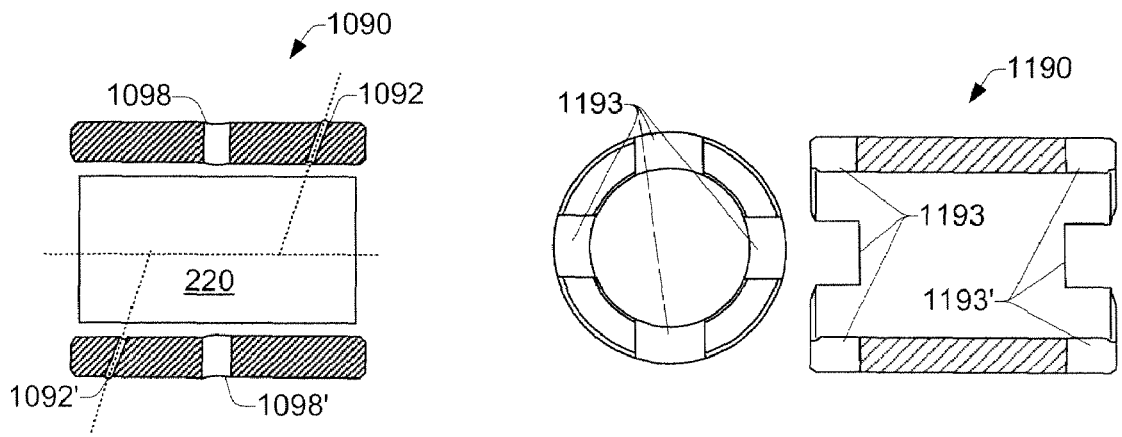
FIG. 10 is a cross-sectional view of an exemplary bearing spacer.
FIG. 11 is a cross-sectional view of an exemplary slotted bearing spacer.

FIG. 10 shows a cross-sectional view of an exemplary bearing spacer 1090 in conjunction with a shaft 220. In this example, shaft lubricant openings 1092, 1092' are set at an angle to the axis of the shaft 220. Such an angle or angles may be selected to improve cooling or lubricant flow to a shaft.

FIG. 11 shows a cross-sectional view and an end view of an exemplary bearing spacer 1190. The bearing spacer 1190 includes four slots on each end and does not include any other wall openings. Such a bearing spacer 1190 may be provided and then modified to introduce other features as appropriate (e.g., cross-drilled to create an opening).

Figure 12:
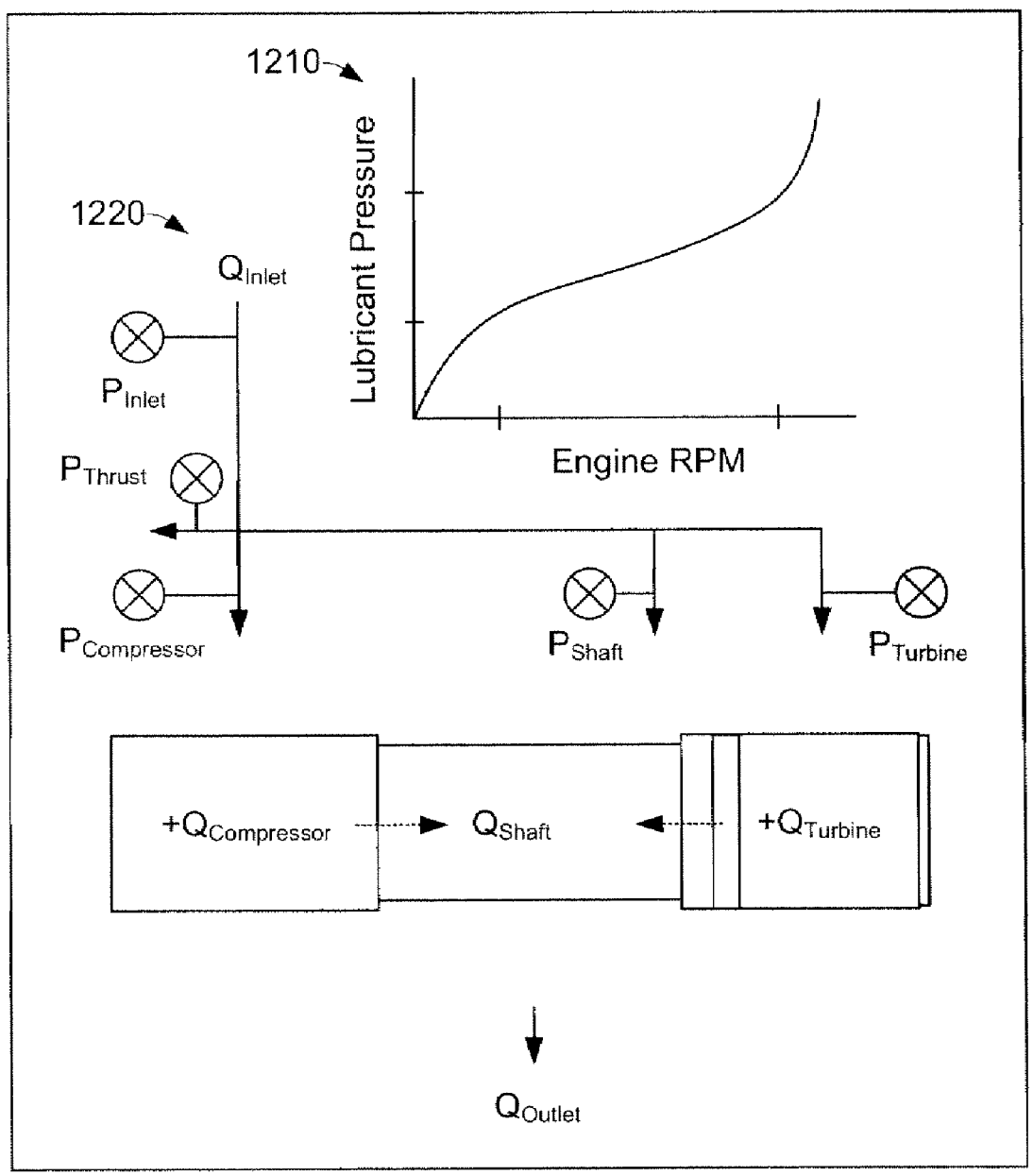
FIG. 12 is a diagram of an exemplary analysis to aid in lubricant cooling of a shaft.

FIG. 12 shows a diagram that may be used in determining bearing and/or bearing spacer features and/or center housing features. A plot 1210 indicates how lubricant pressure may vary with respect to engine rotational speed (rpm) for a conventional internal combustion engine (see, e.g., the engine 110 of FIG. 1). In general, lubricant pressure increases with respect to engine rotational speed yet maintains a pressure adequate for flow of lubricant over an operational range. Vehicle manufacturers have traditionally recommended a minimum of 10 psi of oil pressure for every 1,000 rpm of engine speed. Using these numbers, most stock engines do not require more than about 50 psi to about 60 psi of oil pressure; noting that high performance engines (e.g., reaching rotational speeds in excess of 6,000 rpm) may require higher pressures.

A schematic diagram 1220 indicates lubricant pressures (P) and heat energy (Q) at various points in a center housing rotational assembly. For an overall inlet lubricant pressure of about 30 psi, for example, a lubricant jet (e.g., opening diameter of about 1 mm) directed to a shaft may provide for a flow of about 1 gallon per minute or more to thereby cool the shaft.

As indicated, heat generation occurs at the compressor side bearing and at the turbine side bearing which is conducted or otherwise transferred at least in part to a portion of the shaft disposed between the compressor and turbine bearings. Further, lubricant entering the center housing carries a heat and may further increase its heat content en route to a bearing system. However, the lubricant's heat content is low enough to absorb additional heat from the shaft as provided via a shaft lubricant path. Overall, heat removed by the lubricant ($Q_{outlet} - Q_{inlet}$), aims to maintain various surfaces at temperatures that reduce risk of coke formation; noting that many reactions depend on time and temperature. While shaft lubricant is shown as being closer to the turbine end of the shaft, the location (or locations) may be at any portion of the shaft between the compressor and turbine bearing surfaces. However, as noted previously, a turbine wheel may conduct heat via the shaft to a center housing and, hence, a lubricant jet impinging on the shaft closer to the turbine end may remove heat more efficiently (i.e., larger ΔT).

An analysis of heat removal based on factors such as lubricant composition and viscosity, rotational speed of a engine, rotational speed of a turbine, mass of a rotating assembly (e.g., compressor wheel, shaft, turbine wheel), etc., may be used to determine one or more features of a shaft lubricant jet for purposes of shaft cooling.

An exemplary method includes sizing an opening cross-sectional area for a lubricant jet directed to a shaft intermediate a compressor side journal surface and a turbine side journal surface. Such a jet may emerge from a center housing or may emerge from a bearing spacer. A bearing spacer may act to control timing of such a jet.

As described herein, an exemplary center housing rotating assembly may include a turbine wheel (e.g., the turbine wheel 260); a compressor wheel (e.g., the compressor wheel 240, which may optionally include titanium); a center housing (e.g., consider the housings 380, 480, 580 or 780) that includes a through bore extending from a compressor end to a turbine end, a lubricant inlet (e.g., the inlet 270) and a lubricant outlet (e.g., the outlet 279); a pair of bearings (e.g., the bearings 232, 232') disposed at least partially in the through bore of the center housing; a rotatable bearing spacer (790, 1190) disposed in the through bore between the pair of bearings wherein the bearing spacer comprises a cylindrical wall having an axial length defined by a turbine side end and a compressor side end and slots at least one end where a slot extends axially inward from the turbine side end or the compressor side end; and a shaft (e.g., the shaft 220) rotatably supported by the pair of bearings and having a rotational axis coincident with a rotational axis of the turbine wheel and a rotational axis of the compressor wheel. In particular, the center housing may include bearing lubricant paths (e.g., the paths 271, 272) to direct lubricant from the lubricant inlet to the pair of bearings and a shaft lubricant path (e.g., consider the shaft lubricant paths 373, 473, 573, 573', 773) to direct lubricant from the lubricant inlet to the shaft in a manner dependent on rotational position of the bearing spacer in the through bore of the center housing. For example, a slot may allow lubricant to flow from the lubricant inlet to the shaft. A slot may have dimensions that allow such flow to be unimpeded. Rotation of the bearing spacer with respect to the housing may cause flow to be periodic or pulsatile, for example, in a manner dependent on position of a slot or slot.

In such an exemplary assembly, the center housing may include a shaft lubricant bore (e.g., consider the bores 383, 483, 583, 583', 783) that defines part of the shaft lubricant path where the shaft lubricant bore has an opening at the through bore of the center housing. Such a shaft lubricant bore may have a substantially cylindrical shape and have a shaft lubricant bore length along an axis passing centrally through the shaft lubricant bore and the axis of the shaft lubricant bore may extend through the lubricant outlet of the center housing (e.g., the shaft lubricant bore may be drilled or otherwise formed by insertion of a tool, a cutting jet or beam via the lubricant outlet of the center housing).

An exemplary center housing may include a shaft lubricant bore that defines part of a shaft lubricant path where the shaft lubricant bore has an opening at a through bore of the center housing. A bearing spacer, positioned in the through bore of the center housing, may include one or more slots that extend axially inward from a turbine side end or a compressor side of the bearing spacer. As an edge of a slot rotates past the opening of the shaft lubricant bore, lubricant may be directed to a shaft or may cease being directed to a shaft. Further, the axial depth of a slot may allow for unimpeded flow of lubricant from the shaft lubricant bore opening to a shaft.

An exemplary center housing may have more than one shaft lubricant path and more than one shaft lubricant bore where each bore includes an opening at the through bore of the center housing. For example, a center housing may have a turbine side shaft lubricant bore and opening and a compressor side shaft lubricant bore and opening and a bearing spacer may have slots or openings that allow or direct lubricant to a shaft disposed in the through bore of the center housing.

An exemplary center housing rotating assembly may include a turbine wheel (e.g., the turbine wheel 260); a compressor wheel (e.g., the compressor wheel 240, which may optionally include titanium); a center housing (e.g., consider the housings 380, 480, 580, 780) that include a through bore extending from a compressor end to a turbine end, a lubricant inlet and a lubricant outlet; a pair of bearings (e.g., the bearings 232, 232') disposed at least partially in the through bore of the center housing; a rotatable bearing spacer (e.g., consider the spacers 390, 490, 590, 890, 990, 1090) disposed in the through bore between the pair of bearings where the bearing spacer has a cylindrical wall with an axial length defined by a turbine side end and a compressor side end and at least one wall opening; and a shaft (e.g., the shaft 220) rotatably supported by the pair of bearings and having a rotational axis coincident with a rotational axis of the turbine wheel and a rotational axis of the compressor wheel. In particular, such a center housing may include bearing lubricant paths (e.g., the paths 271, 272) to direct lubricant from the lubricant inlet to the pair of bearings and a shaft lubricant path (e.g., consider the paths 373, 473, 573, 573', 773) to direct lubricant from the lubricant inlet to the shaft in a manner dependent on rotational position of the bearing spacer in the through bore of the center housing. The shaft lubricant path may be defined in part by a shaft lubricant bore, which may be drilled or otherwise formed by insertion of a tool, a cutting jet or beam via an end of the through bore of the center housing.

An exemplary center housing rotating assembly may include a shaft lubricant bore that defines part of a shaft lubricant path where the shaft lubricant bore has an opening at a through bore of the center housing and where a bearing spacer has an opening that allows the shaft lubricant path to direct lubricant from the opening to a shaft disposed in the through bore. For example, when the opening of the bearing spacer aligns with the opening of the shaft lubricant bore, lubricant may be directed to a shaft disposed in the through bore.

Although some exemplary methods, devices, systems, arrangements, etc., have been illustrated in the accompanying Drawings and described in the foregoing Detailed Description, it will be understood that the exemplary embodiments disclosed are not limiting, but are capable of numerous rearrangements, modifications and substitutions without departing from the spirit set forth and defined by the following claims.

What is claimed is:

1. A center housing rotating assembly comprising:
   a turbine wheel (260);
   a compressor wheel (240);
   a center housing (380, 480, 580, 780) that comprises a through bore extending from a compressor end to a turbine end, a lubricant inlet and a lubricant outlet;
   a pair of bearings (232, 232') disposed at least partially in the through bore of the center housing;
   a rotatable bearing spacer (790, 1190) disposed in the through bore between the pair of bearings wherein the bearing spacer comprises a cylindrical wall having an axial length defined by a turbine side end and a compressor side end and slots at at least one end wherein a slot extends axially inward an axial slot depth from the turbine side end or the compressor side end; and
   a shaft (220) rotatably supported by the pair of bearings and having a rotational axis coincident with a rotational axis of the turbine wheel and a rotational axis of the compressor wheel;
   wherein the center housing comprises bearing lubricant paths to direct lubricant from the lubricant inlet to the pair of bearings (271, 272) and a shaft lubricant path (373, 473, 573, 573', 773) to direct lubricant from the lubricant inlet to the shaft; and
   wherein the center housing comprises a shaft lubricant bore (383, 483, 583, 583', 783) that defines part of the shaft lubricant path wherein the shaft lubricant bore comprises an opening at the through bore of the center housing, the opening positioned axially within a span defined by the axial slot depth of the rotatable bearing spacer (790, 1190).

2. The center housing rotating assembly of claim 1 wherein the bearing spacer comprises slots at the turbine side end.

3. The center housing rotating assembly of claim 1 wherein the bearing spacer comprises slots at the compressor side end.

4. The center housing rotating assembly of claim 1 wherein the bearing spacer comprises slots at the compressor side end and slots at the turbine side end.

5. The center housing rotating assembly of claim 1 wherein the shaft lubricant path directs lubricant from the lubricant inlet to the shaft in a manner dependent on rotational position of the bearing spacer in the through bore of the center housing.

6. The center housing rotating assembly of claim 1 wherein the shaft lubricant bore comprises a substantially cylindrical shape having a shaft lubricant bore length along an axis passing centrally through the shaft lubricant bore.

7. The center housing rotating assembly of claim 6 wherein the axis passing through the shaft lubricant bore extends through the lubricant outlet of the center housing.

8. The center housing rotating assembly of claim 1 wherein the slots comprise slots that extend axially inward from the turbine side end of the bearing spacer allow the shaft lubricant path to direct lubricant from the lubricant inlet to the shaft.

9. The center housing rotating assembly of claim 8 wherein the slots that extend axially inward from the turbine side end of the bearing spacer allow the shaft lubricant path to direct lubricant from the opening to the shaft.

10. The center housing rotating assembly of claim 1 wherein the compressor wheel comprises a titanium compressor wheel.

11. A center housing rotating assembly comprising:
    a turbine wheel (260);
    a compressor wheel (240);
    a center housing (380, 480, 580, 780) that comprises a through bore extending from a compressor end to a turbine end, a lubricant inlet and a lubricant outlet;
    a pair of bearings (232, 232') disposed at least partially in the through bore of the center housing;
    a rotatable bearing spacer (390, 490, 590, 890, 990, 1090) disposed in the through bore between the pair of bearings wherein the bearing spacer comprises a cylindrical wall having an axial length defined by a turbine side end and a compressor side end and at least one wall opening; and
    a shaft (220) rotatably supported by the pair of bearings and having a rotational axis coincident with a rotational axis of the turbine wheel and a rotational axis of the compressor wheel;
    wherein the center housing comprises bearing lubricant paths (271, 272) to direct lubricant from the lubricant inlet to the pair of bearings and a shaft lubricant path (373, 473, 573, 573', 773) to direct lubricant from the lubricant inlet to the shaft through at least one of the at least one wall opening;
    wherein the center housing comprises a shaft lubricant bore (383, 483, 583, 583', 783) that defines part of the shaft lubricant path wherein the shaft lubricant bore comprises an opening at the through bore of the center housing the opening aligned axially with at least one of the at least one wall opening of the rotatable bearing spacer (390, 490, 590, 890, 990, 1090); and wherein the shaft lubricant path directs lubricant from the lubricant inlet to the shaft through at least one of the at least one wall opening in a manner dependent on rotational position of the bearing spacer in the through bore of the center housing.

12. The center housing rotating assembly of claim 11 wherein the shaft lubricant bore comprises a substantially cylindrical shape having a shaft lubricant bore length along an axis passing centrally through the shaft lubricant bore.

13. The center housing rotating assembly of claim 12 wherein the axis passing through the shaft lubricant bore extends through an end of the through bore of the center housing.

14. The center housing rotating assembly of claim 13 wherein the axis passing through the shaft lubricant bore extends through the lubricant outlet of the center housing.

15. The center housing rotating assembly of claim 11 wherein at least one of the at least one wall opening of the bearing spacer allows the shaft lubricant path to direct lubricant from the lubricant inlet to the shaft.

16. The center housing rotating assembly of claim 11 wherein the compressor wheel comprises a titanium compressor wheel.

17. A center housing assembly for a turbocharger comprising:
- a center housing (380, 480, 580, 780) that comprises a through bore extending from a compressor end to a turbine end to receive a rotatable shaft, a lubricant inlet and a lubricant outlet; and
- a rotatable bearing spacer (390, 490, 590, 890, 990, 1090) disposed in the through bore to space a pair of bearings wherein the bearing spacer comprises a cylindrical wall having an axial length defined by a turbine side end and a compressor side end and at least two wall openings;
- wherein the center housing comprises a shaft lubricant path (373, 473, 573, 573', 773) that comprises an opening along the through bore, axially aligned with at least one of the at least two wall openings to direct lubricant from the lubricant inlet to a shaft, received by the through bore, through the at least one of the at least two wall openings; and
- wherein the bearing spacer comprises at least one wall opening positioned along the axial length of the bearing spacer toward the compressor end and at least one wall opening positioned along the axial length of the bearing spacer toward the turbine end.

18. The center housing assembly of claim 17 wherein the shaft lubricant path directs lubricant from the lubricant inlet to a shaft in a manner dependent on rotational position of the bearing spacer in the through bore of the center housing.

19. A center housing assembly for a turbocharger comprising:
- a center housing (380, 480, 580, 780) that comprises a through bore extending from a compressor end to a turbine end to receive a rotatable shaft, a lubricant inlet and a lubricant outlet;
- a rotatable bearing spacer (790, 1190) disposed in the through bore to space a pair of bearings wherein the bearing spacer comprises a cylindrical wall having an axial length defined by a turbine side end and a compressor side end and slots at at least one end wherein a slot extends axially inward an axial slot depth from the turbine side end or the compressor side end;
- wherein the center housing comprises a shaft lubricant path (373, 473, 573, 573', 773) that comprises an opening along the through bore positioned axially within a span defined by the axial slot depth of the rotatable bearing spacer (790, 1090) to direct lubricant from the lubricant inlet to a shaft received by the through bore of the center housing; and
- wherein the shaft lubricant path directs lubricant from the lubricant inlet to a shaft received by the through bore in a manner dependent on rotational position of the bearing spacer in the through bore of the center housing.

20. The center housing assembly of claim 19 wherein the bearing spacer comprises four slots that extend axially inward from the turbine end and four slots that extend axially inward from the compressor end.

* * * * *